(12) United States Patent
Berdais et al.

(10) Patent No.: US 6,523,988 B1
(45) Date of Patent: Feb. 25, 2003

(54) PROCESSING FOOD OR FODDER

(75) Inventors: Karl-Heinz Berdais, Konstanz (DE); Markus Meyer, Egnach (CH); Stefan Rutishauser, St. Gallen (CH)

(73) Assignee: Buhler AG, Uzwil (CH)

( * ) Notice: Subject to any disclaimer, the term of this patent is extended or adjusted under 35 U.S.C. 154(b) by 0 days.

(21) Appl. No.: 09/308,636

(22) PCT Filed: Aug. 19, 1998

(86) PCT No.: PCT/CH98/00351
§ 371 (c)(1),
(2), (4) Date: May 27, 1999

(87) PCT Pub. No.: WO99/17625
PCT Pub. Date: Apr. 15, 1999

(30) Foreign Application Priority Data

Oct. 1, 1997 (DE) .......................... 197 43 470

(51) Int. Cl.[7] .................................. B01F 7/04
(52) U.S. Cl. ................... 366/76.1; 366/155.1; 366/301; 366/603
(58) Field of Search ............... 366/155.1, 186, 366/290, 291, 297, 298, 300, 301, 603, 76.3, 76.4, 76.6, 97, 91, 85, 156.1, 156.2, 158.4, 76.1

(56) References Cited

U.S. PATENT DOCUMENTS

| | | | | |
|---|---|---|---|---|
| 196,882 | A | * | 11/1877 | Dietz |
| 976,363 | A | * | 11/1910 | Hinkhouse |
| 1,134,220 | A | * | 4/1915 | Nash |
| 1,419,397 | A | * | 6/1922 | Marsh |
| 3,698,693 | A | * | 10/1972 | Poncet |
| 4,001,452 | A | | 1/1977 | Williams |
| 4,161,139 | A | | 7/1979 | Van Deuren |
| 4,298,289 | A | * | 11/1981 | Walley |
| 4,752,139 | A | | 6/1988 | Hauck |
| 4,775,239 | A | | 10/1988 | Martinek et al. |
| 4,989,504 | A | | 2/1991 | Jay |
| 5,161,888 | A | | 11/1992 | Hauck |
| 5,460,448 | A | | 10/1995 | Woolsey |
| 5,505,542 | A | * | 4/1996 | Braeker et al. |
| 5,658,075 | A | * | 8/1997 | Schebesta et al. |

FOREIGN PATENT DOCUMENTS

| | | |
|---|---|---|
| DE | 2621266 | 11/1977 |
| DE | 3117023 | 3/1982 |
| GB | 2030463 | 4/1980 |

* cited by examiner

Primary Examiner—Charles E. Cooley
Assistant Examiner—David Sorkin
(74) Attorney, Agent, or Firm—Greenblum & Bernstein, P.L.C.

(57) ABSTRACT

A device for processing foodstuffs or feedstuffs exhibits a conditioning device (2, 3) encompassing a mixing chamber (3) over a retention chamber (2), which are interconnected. Each chamber has a rotor shaft (4, 6) that extends lengthwise into the chamber, and each rotor (4, 6–8) is equipped with the corresponding tools (7, 8) all around the shaft (4, 6). The retention chamber (2) exhibits a second shaft (5), whose tools (7) intermesh for purposes of joint conveyance.

5 Claims, 4 Drawing Sheets

PROCESSING FOOD OR FODDER

CROSS-REFERENCE TO RELATED APPLICATIONS

The present application is a U.S. National Stage of International Application No. PCT/CH98/00351 filed Aug. 19, 1998, which claims priority under 35 U.S.C. §119 of German Patent Application No. 197 43 470.3, filed on Oct. 1, 1997.

BACKGROUND OF THE INVENTION

1. Field of the Invention

The present invention relates to an apparatus for processing foodstuff or feedstuffs that includes a conditioning device formed by a mixing chamber coupled to and arranged over a retention chamber. Each of these chambers include a rotor shaft that extend lengthwise into the chambers, and each of the rotor shafts are provided with tools that are arranged around the rotor shafts.

2. Discussion of Background Information

A preconditioner for an extruder is known from U.S. Pat. No. 4,752,139. The preconditioner consists of a large and small chamber, which each exhibit a separate mixing shaft with beaters. The mixing shaft in the small chamber is faster than the other mixing shaft, so that the product remains in the large chamber a relatively longer time. According to U.S. Pat. No. 4,752,139, the product first passes into the small chamber, where it is thoroughly mixed, then proceeds to the large chamber, and then back to the small chamber, from which the product passes to an extruder. Since both chambers serve as mixing chambers, the actual retention time for various parts of the processed material is difficult to determine in advance, i.e., some parts will be processed for a longer time, while other parts will be processed for only a short time.

U.S. Pat. No. 5,460,448 also discloses a preconditioner with intermeshing mixing chambers. The mixing tools situated on the shafts in the respective chambers are arranged in such a way as to convey first in one and then the other direction, which achieves a good mixing result, but results in a poor setting of the retention time. As in U.S. Pat. No. 4,752,139, mixing takes place primarily in the central area between the- chambers. Similarly, the preconditioner according to U.S. Pat. No. 5,161,888 has two interconnected mixing chambers.

A device of the type discused above is described, for example, in the form of a preconditioning device in U.S. Pat. No. 4,001,452. In this publication, a preconditioning device is used in combination with an extrusion device (in the most general of terms), namely a feed cube press. Of course, the area of application is not limited to this kind of extrusion device. Rather, applications exist anywhere that foodstuffs or feedstuffs, in particular foodstuffs with a high percentage of flour, e.g., in seed and cereal grains, in the form of flakes, etc., are to be processed into an end product. These ingredients are first mixed with water and treated with steam before being processed further.

The known device consists of two chambers. One chamber accommodates a shaft with mixing tools, while the downstream chamber serves as a retention chamber, and therefore contains only one screw conveyor. As a result of this task allocation, the ingredients are first thoroughly mixed, and then allowed to interact for a prolonged time in the retention zone. The disadvantage to this arrangement is that using just one screw conveyor supplies the downstream extrusion device in batches, since it has been shown that the material is subjected to slippage relative to the screw conveyor. In this case, material first accumulates in front of the outlet end of the screw conveyor before surging out of the device. However, the downstream device is comprised of an extruder (in the narrower sense of the word), and the result is that the extruder receives an irregular supply, i.e., cannot be operated to full capacity. In addition, the discharge of material from the retention zone in batches results in an uneven treatment of the material.

In principle, this is also the case with respect to U.S. Pat. No. 4,161,139, in which a first mixing chamber is set up. However, this mixing chamber then divides the material into two retention chambers, which are large relative to the mixing chamber and situated next to each other at the same distance, with one screw conveyor each. Since the mixing chamber is small, only a very small portion of the mixed material makes it into each retention chamber. Evidently, the objective here was to balance out the amounts conveyed, hoping that the surging amounts of conveyed material would not always exit at the same time, thereby allowing the quantity conveyed to even out overall. Even if this had been the goal, it was a statistical miscalculation, since while the quantity conveyed might well have been evened out in some instances, the surging material could in other cases also have been simultaneously conveyed into the next device, compounding the non-uniform distribution even more. The known device also makes no sense in terms of the desired preconditioning, since little room is set aside for mixing, so that in part only insufficiently mixed material is present in the two separate retention chambers.

As evident, then, the disparate requirements of a short, yet thorough mixing, a sufficiently uniform retention time and an as uniform as possible continued transport of the preconditioned material can only be satisfied with difficulty. Another problem is that hygiene conditions must always be ensured during the manufacture of foodstuffs and feedstuffs. However, these conditions are only possible in the known devices by repeatedly turning off the machine during relatively time-consuming cleaning procedures. This results in down times that are practically unacceptable today.

SUMMARY OF THE INVENTION

Hence, the invention relates to a device of the kind mentioned at the outset that additionally includes a second shaft provided within the retention chamber, such that the second shaft is provided with tools arranged around the second shaft, and the second shaft and the rotor shaft of the retention chamber are arranged so that their respective tools intermesh.

As in U.S. Pat. No. 4,161,139, the mixing chamber is situated above the retention chamber, which exhibits two shafts.

However, the basic difference is that two separate retention chambers are not provided. Rather, the tools on both shafts intermesh for conveyance purposes. As a result of the fact that two shafts now interact during conveyance in the manner known for double screw extruders, the respective downstream device, e.g. an extruder, is uniformly supplied and can be operated at full capacity, thereby raising overall production. Moreover, the uniform conveyance leads to a more uniform preconditioning, which produces a uniform taste, in particular in foodstuffs.

However, the fact that the tools on the shaft intermesh has another advantageous effect which is, specifically reflected in a continuous self-cleaning of the tools. In this manner hygiene problems can be preluded more easily and down times can be reduced for cleaning purposes. The additional feature that the tools are intended for conveyance is also what ensures the desired relatively uniform retention time.

In particular a balanced ratio between mixing and retention time can be realized, and this feature can be achieved, e.g., if necessary, with paddles to exert a certain mixing effect in addition to the conveying action.

The present invention is directed to an apparatus for processing foodstuffs or feedstuffs. The apparatus includes a conditioning device including a mixing chamber and a retention chamber. The mixing chamber is coupled to and arranged over the retention chamber. Each of the mixing and retention chambers includes a rotor shaft arranged to extend lengthwise into the chamber, and each rotor shaft includes tools arranged around the shaft. The retention chamber further includes a second shaft and tools arranged around the second shaft, and the tools of the rotor shaft of the retention chamber and of the second shaft are arranged to intermesh.

According to another feature of the present invention, the tools of the retention chamber can include conveyor paddles.

In accordance with another feature of the invention, an extruder can be coupled downstream, relative to a direction of movement of the foodstuffs or feedstuffs, from the conditioning device. The extruder can include two screw conveyors, which can be two intermeshing screw conveyors.

According to still another feature of the instant invention, a mixing driver may be coupled to drive the rotor shaft of the mixing chamber, and a retention driver may be coupled to drive the rotor shaft of the retention chamber and the second shaft. The mixing driver and the retention driver can be adapted to provide a speed ratio of the mixing driver to the retention driver of between 15:1 and 7:1, and the speed ratio may be 10:1.

In accordance with a further feature of the present invention, a mixing driver can be coupled to drive the rotor shaft of the mixing chamber, and a retention driver can be coupled to drive the rotor shaft of the retention chamber and the second shaft. The mixing driver can be adapted to provide a peripheral velocity of said tools of the mixing chamber of between 7 and 15 m/s, and the peripheral velocity may be 10 mn/s.

According to a still further feature of the instant invention, the tools of the mixing chamber can include paddles and paddle arms. The paddle arms may couple the paddles to the rotor shaft of the mixing chamber.

According to another feature of the present invention, the tools of the rotor shaft of the retention chamber and the tools of the second shaft can be tightly intermeshed to produce a self cleaning effect.

In accordance with a further feature of the instant invention, the tools of the rotor shaft of the retention chamber and the tools of the second shaft can be screw conveyors.

The present invention is directed to a process for processing foodstuffs or feedstuffs in an apparatus that includes a condition device formed by a mixing chamber coupled to and arranged over a retention chamber, wherein each of the mixing and retention chambers includes a rotor shaft arranged to extend lengthwise into the chamber, each rotor shaft includes tools arranged around the shaft, the retention chamber further includes a second shaft and tools arranged around the second shaft, and tools of the rotor shaft of the retention chamber and of the second shaft are arranged to intermesh. The process includes inserting one of foodstuffs and feedstuffs into the mixing chamber, rotating the rotor shafts of the mixing chamber and, thereby, the tools of the mixing chamber, and mixing and conveying the one of foodstuffs and feedstuffs via the rotation of the tools of the mixing chamber through the mixing chamber and into the retention chamber. The process also includes rotating the rotor shaft and the second shaft of the retention chamber and, thereby, the tools of rotor shaft and the second shaft of the retention chamber, and mixing and conveying the one of the foodstuffs and feedstuffs via the rotation of the tools of the rotor shaft and the second shaft of the retention chamber through the retention chamber and to an outlet.

In accordance with another feature of the present invention, the apparatus can further include an extruder coupled to the outlet, and the process can further include extruding the one of the foodstuffs and feedstuffs from the retention chamber.

According to still another feature of the invention, the process can also include driving the rotor shaft of the mixing chamber at a speed greater than the speed of the rotor shaft and second shaft of the retention chamber. A speed ratio between the rotor shaft of the mixing chamber and rotor shaft and second shaft of the retention chamber can be between 15:1 and 7:1, and maybe 10:1.

In accordance with yet another feature of the present invention, a peripheral velocity of the tools of the mixing chamber can be between 7 and 15 m/s, and may be 10 m/s.

BRIEF DESCRIPTION OF THE DRAWINGS

The invention will be illustrated in greater detail below based upon an embodiment shown schematically in the drawing. Shown on.

DETAILED DESCRIPTION OF THE PRESENT INVENTION

Figure 1:
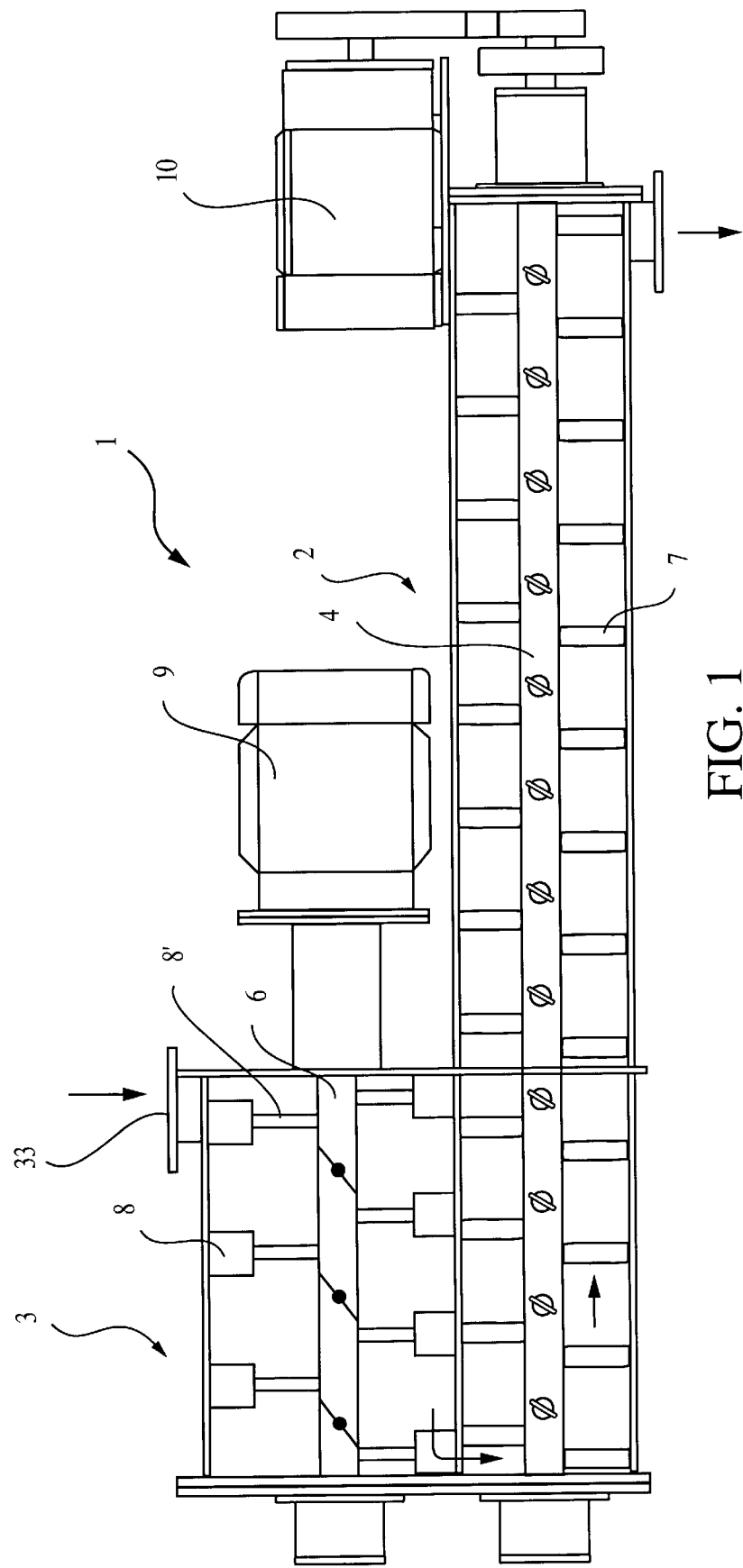
FIG. 1 illustrates a side view of a first embodiment.

FIG. 1 shows a preconditioner 1 according to the invention, wherein product flow is indicated by arrows. Preconditioner 1 includes a relatively short mixing chamber 3, which accommodates a mixing shaft 6 with mixing tools 8, and a relatively elongated retention chamber 2. In a first mixing phase, a raw product, e.g. meal, is intensively mixed and/or heated in mixing chamber 3 with several additives, such as fats, oils, flavors, water, water vapor, dispersions or pigments. As a result, mixing chamber 3 can also exhibit feed pipes 31 and 32(see FIG. 1A) right at the beginning, i.e. near an inlet 33, to supply fluid ingredients such as water vapor and molasses, etc.

As is evident from the exemplary Figure, mixing tools 8 are designed as paddles situated on the outside end of arms 8' so that their effect only extends to the marginal or peripheral area of mixing chamber 3. There can be two reasons for this. Either these paddle s are arranged in three planes under one angle in accordance with DE-C-31 17 023, so that the mixed material is thrown axially and radially to the inside and thoroughly mixed in this way, and/or mixing shaft 6 makes paddles 8 move at such a high peripheral velocity that the mixed material is practically converted into a fluidic state, which produces a ring of fluidized material near the paddles due to the centrifugal force. The content of the cited DE-C-31 17 023 will be regarded as disclosed by way of reference.

The arrangement of radially relatively short paddles s on the relatively long arms 8' also leaves more open space free of built-in components in the radially more interior area, allowing the thorough, unobstructed mixing of the material. In combination with the aforementioned fluidization, this makes it possible to bring all sides of the solid product into contact with moisture, steam, liquid or other additives. In addition, the arrangement is advantageously such that the speed ratio between the rotors in mixing chamber 3 and retention chamber 2 ranges from 15:1 to 7:1, preferably lying around 10:1. In this case, it is preferred that paddles reach a peripheral velocity of 7 to 15 m/s, most preferably of around 10 m/s.

Figure 1A:
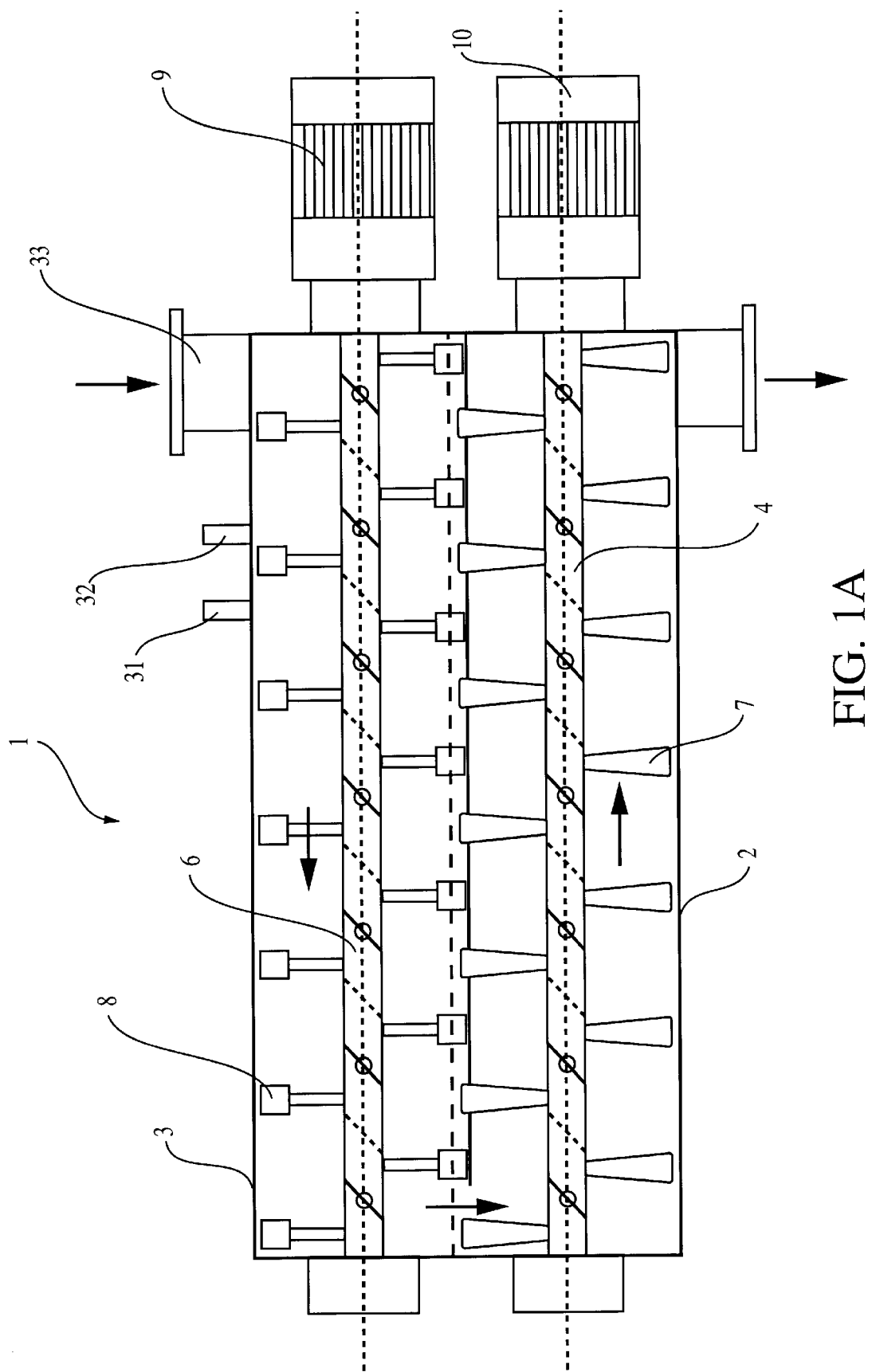
FIG. 1A illustrates optional embodiment.
Figure 3:
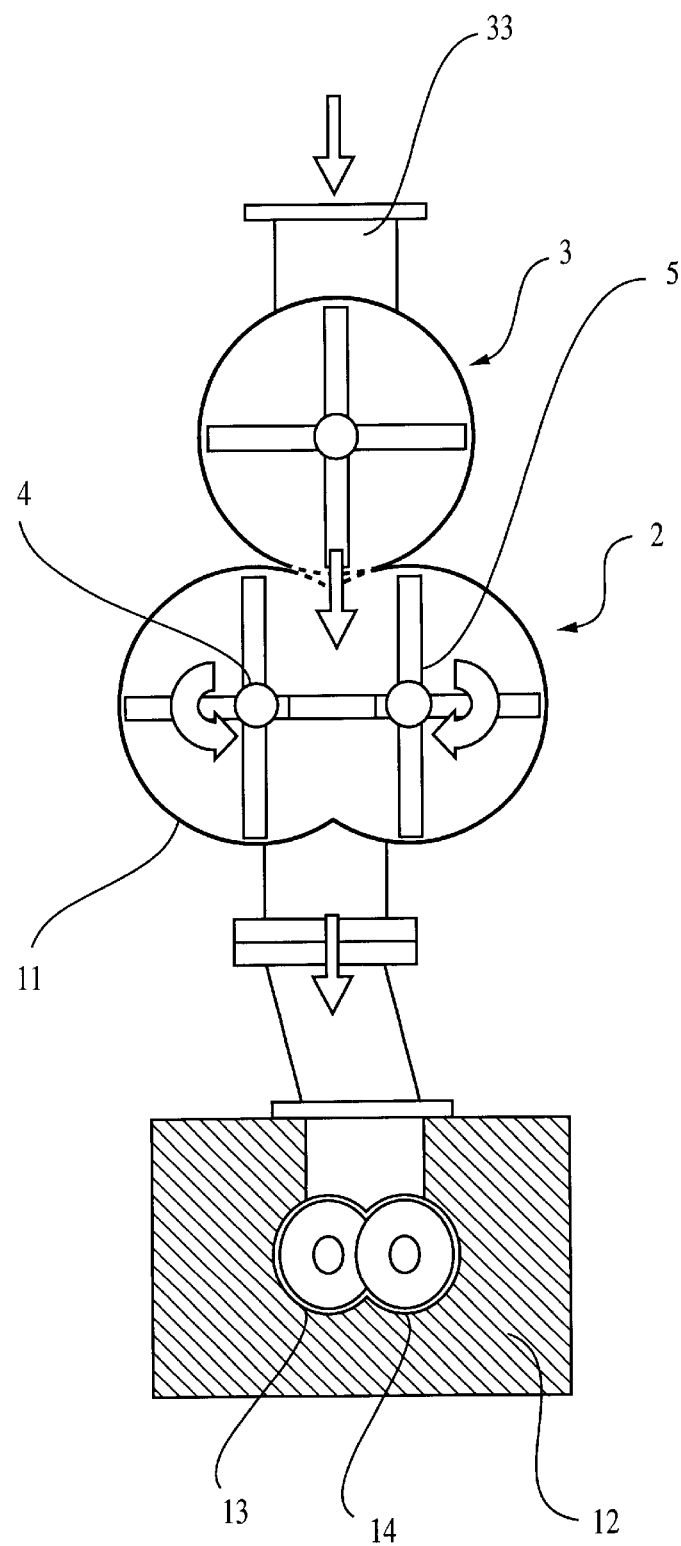
FIG. 3 illustrates a front view of a preconditioner with front casing wall removed, and a double screw extruder lying below after removal of its matrix, which determines the product shape.

FIG. 1A is intended to show that the axial length of mixing and retention chamber, even relative to each other, can be variably adjusted depending on the expected operating conditions and application, if necessary using modular configurations. For example, mixing chamber 3 could have a relatively higher diameter than chamber 2 located beneath it; however, a correlation as shown in FIG. 3 might also make sense.

As is evident from FIGS. 1 and 1A, retention chamber 2 is equipped with conveyor paddles 7 whose purpose is twofold. First, they ensure a reliable transport, primarily between two conveyor shafts 4 and 5 (see FIG. 2), as also indicated by the accumulation of material 11 in FIG. 3. Second, they allow the material to change course, which results in additional mixing and complete homogenization. This may be a reason why mixing chamber 3 can be dimensioned relatively small (FIG. 1). A longer mixing chamber according to FIG. 1A may be advantageous for materials that tend to be non-homogenous.

Figure 2:
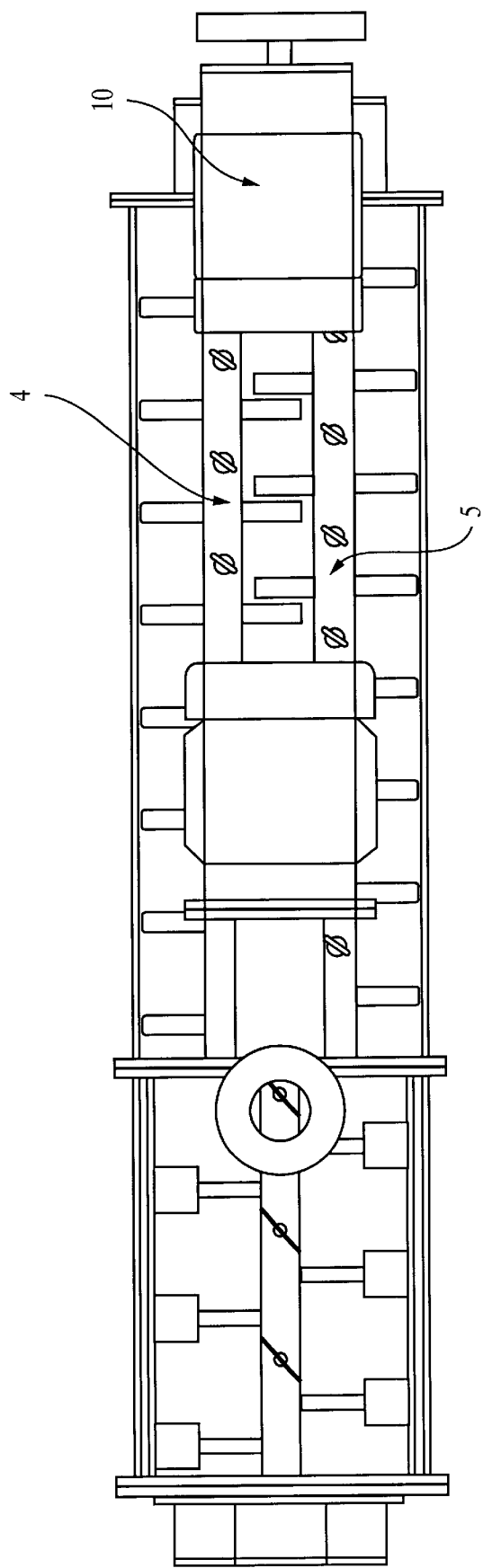
FIG. 2 illustrates a top view of FIG. 1 with the casing removed from the top of the retention chamber.

In addition, FIG. 2 shows that tools 7 mesh together tightly, thereby scraping off any material hanging from them, and also cleaning the tools (self-cleaning effect). This both satisfies the required hygiene conditions and meets the requirement of a uniform retention time, since any material that remains longer than desired in retention chamber 2 can be exposed to bacteria, and the excess treatment can detract from the taste. Shafts 4 to 6 are driven by motors 9 or 10, which are able to generate the speeds and peripheral velocities discussed above.

Of course, it would be entirely possible, within the framework of the invention, to lengthen mixing chamber 3, while designing retention chamber 2 as strictly a conveyor chamber, but with two screw conveyors. However, the embodiment shown with paddles is preferred.

As shown on FIG. 3, the preconditioned product is preferably fed to an extruder 12, which is more uniformly loaded according to the invention. As depicted, this extruder 12 advantageously is a double screw extruder with two intermeshing screws 13, 14. Such screws could also serve as conveyor units in retention chamber 2, a noted above. In addition, shafts 4 and 5 shown on FIG. 2 are many times slower than shaft 6 depicted on FIG. 1, so that the product remains in the retention chamber for a longer time. This can cause elevated moisture permeation into the mixed product. In addition, enzymes can be deactivated and the pH value can be adjusted or approximated depending on the product. As already mentioned above, the flavor of the end product is also improved. Important for foodstuffs on the one hand, the configuration according to the invention also yields great advantages in the feedstuffs industry by improving the consistency of achievable pellets. For example, fish food pellets, whose settling rate and consistency have a considerable effect on the longevity of such pellets in water.

What is claimed is:

1. A process for processing foodstuffs or feedstuffs in an apparatus including a conditioning device formed by a mixing chamber coupled to and arranged over a retention chamber, wherein each of the mixing and retention chambers includes a rotor shaft arranged to extend lengthwise into the chamber, each rotor shaft includes tools arranged around the shaft, the retention chamber further includes a second shaft and tools arranged around the second shaft, and tools of the rotor shaft of the retention chamber and of the second shaft are arranged to intermesh, the process comprising:

inserting one of foodstuffs and feedstuffs into the mixing chamber;

rotating the rotor shafts of the mixing chamber and, thereby, the tools of the mixing chamber;

mixing and conveying the one of foodstuffs and feedstuffs via the rotation of the tools of the mixing chamber through the mixing chamber and into the retention chamber;

rotating the rotor shaft and the second shaft of the retention chamber and, thereby, the tools of the rotor shaft and the second shaft of the retention chamber;

mixing and conveying the one of foodstuffs and feedstuffs via the rotation of the tools of the rotor shaft and the second shaft of the retention chamber through the retention chamber and to an outlet, wherein said tools of said rotor shaft of said retention chamber and said tools of said second shaft are arranged to scrape off material hanging from them, thereby producing a self cleaning effect; and driving the rotor shaft of the mixing chamber at a speed greater than the speed of the rotor shaft and second shaft of the retention chamber, wherein the speed ratio between the rotor shaft of the mixing chamber and rotor shaft and second shaft of the retention chamber is between 15:1 and 7:1.

2. The process according to claim 1, wherein the apparatus further includes an extruder coupled to the outlet, and the process further comprises:

extruding the one of the foodstuffs and feedstuffs from the retention chamber.

3. The process according to claim 1, wherein the speed ratio is 10:1.

4. The process according to claim 1, wherein a peripheral velocity of the tools of the mixing chamber is between 7 and 15 m/s.

5. The process according to claim 4, wherein the peripheral velocity is 10 m/s.

* * * * *